United States Patent [19]

Koba et al.

[11] Patent Number: 4,812,271

[45] Date of Patent: Mar. 14, 1989

[54] CONTINUOUS PROCESS FOR PRODUCING LONG α-ALUMINA FIBERS

[75] Inventors: Keiichiro Koba; Taizo Utsunomiya; Yoshiaki Saitow; Katsusuke Iwanaga; Michihiko Matsue; Noriaki Nishitani, all of Tochigi, Japan

[73] Assignee: Mitsui Mining Company, Limited, Tokyo, Japan

[21] Appl. No.: 93,996

[22] Filed: Sep. 4, 1987

[30] Foreign Application Priority Data

Sep. 17, 1986 [JP] Japan .................................. 61-217182

[51] Int. Cl.$^4$ .............................................. C04B 33/32
[52] U.S. Cl. ........................................ 264/63; 264/66; 264/DIG. 19
[58] Field of Search ............ 264/63, 211.11, DIG. 19, 264/66

[56] References Cited

U.S. PATENT DOCUMENTS 3,808,015  4/1974  Seufert ................................. 501/127
3,953,561  4/1976  Shin ....................................... 264/63

Primary Examiner—James Derrington
Attorney, Agent, or Firm—Oblon, Fisher, Spivak, McClelland & Maier

[57] ABSTRACT

Disclosed is a process for continuously producing highly flexible long α-alumina fibers of small diameter according to the slurry spinning technique. Also disclosed are a specific spinnable slurry containing an alumina powder having an average particles diameter of 0.1 μm or less, the specific thermophysical conditions under which the slurry is spun into a multifilament yarn, and the well-balanced residence time conditions under which the multifilament yarn running as a single continuous fiber is prefired and fired to form a long α-alumina fiber.

9 Claims, No Drawings

CONTINUOUS PROCESS FOR PRODUCING LONG α-ALUMINA FIBERS

BACKGROUND OF THE INVENTION

1. Field of the Invention

This invention relates to a continuous process for producing long α-alumina fibers.

Because of their excellent properties, alumina fibers hold an important position in applications including various heat insulating materials, reinforcements for composite materials, and the like. Among others, long continuous fibers can take a variety of forms such as ropes, nets, woven fabrics and the like. Accordingly, they are advantageous in that they can be used in the form most suitable for the intended purpose so as to exhibit their full performance and in that they are easy to handle. However, long continuous fibers are hard to produce, as compared with short fibers. Thus, there is a demand for an industrially advantageous process for producing long continuous alumina fibers.

The α-alumina fibers produced by the process of the present invention exhibit excellent heat resistance at high temperatures above 1,600° C. and have high tensile strength and high elastic modulus, so that they are useful as reinforcements for metals and ceramics and as structural materials for high-temperature furnaces.

2. Description of the Prior Art

Conventionally, long alumina fibers have been produced by spinning a slurry composed of alumina powder and an aqueous solution of an alumina precursor and firing the spun fiber. Such processes are disclosed in U.S. Pat. Nos. 3,808,015 and 3,953,561. The former relates to a spinnable composition comprising specific small-sized particles containing at least 80% by weight of alumina, and an aqueous solution of an alumina precursor. The description given therein is concerned chiefly with the particle diameter distribution of the small-sized particles, and an additional mention is made of a process for preparing fibers by using the aforesaid composition. The latter relates to a process for producing continuous polycrystalline alumina yarns. According to this process, solid particles containing at least 80% by weight of alumina are mixed in an aqueous phase having an alumina precursor dissolved therein, the ingredients being used in such proportions that the solid particles provide 13 to 97% by weight of the total available oxides in the mixture. This mixture is extruded through a spinneret having a plurality of orifices to form a multifilament yarn containing 30 to 60% by weight of volatile materials. With consideration for the shrinkage of the yarn in subsequent steps, the yarn is wound on a collapsible bobbin to form a yarn package, which is heated (or prefired) at a temperature of 300° to 1,400° C. until the volatiles content of the yarn is reduced to 11% by weight or less. Thereafter, the yarn is unwound from the yarn package and heated to an apparent temperature of 1,000° to 1,800° C.

In these slurry spinning processes, it is necessary to fire the precursor fiber at a high temperature of 1,000° to 1,800° C. Generally, the precursor fiber is liable to breakage in this firing step, because of rapid shrinkage caused by evaporation of volatile components. For this reason, it has been believed that it is difficult to heat the precursor fiber to 1,000° C. or above at a stroke and a prefiring step is required to heat the precursor fiber gently at a rate of not greater than 20° C. per minute. Owing to the lack of balance between the high spinning rate and the low prefiring rate, it has been difficult to prefire the spun precursor fiber continuously.

Accordingly, as described in the above-referenced U.S. Patents, it has been common practice to wind the spun precursor fiber on a bobbin and prefire it gently in a batchwise manner. Alternatively, it has also been known to form large amounts of precursor fibers into bundles or mats and prefire them gently on a belt conveyor. Where these techniques are employed in the production of silica free alumina fibers, the resulting prefired fiber is very fragile and, therefore, may be damaged during unwinding prior to high-temperature treatment at 1,000° C. or above. This brings about a deterioration of fiber properties and makes it impossible to obtain an alumina fiber of good quality.

BRIEF SUMMARY OF THE INVENTION

According to the present inventors' view, the greatest disadvantages of the prior art processes lie in the fact that, since an excessively long time is required for the prefiring step, it is impossible to carry out the spinning and prefiring steps continuously, and also in the fact that, since the prefiring step is carried out in a batchwise manner, the fibers are liable to fusion and are subjected to an uneven tension, resulting in a deterioration of properties. Thus, the present inventors have made a close investigation to improve the prefiring step with due consideration for the preceding and succeeding steps, and have completed the present invention.

As stated before, it has been believed in the past that, in prefiring a precursor fiber formed from a slurry comprising an aqueous solution of a basic aluminum salt, it is necessary to heat the precursor fiber as gently as possible. Accordingly, a long time has been required for the prefiring step and, therefore, it has been difficult to connect the spinningstep with the prefiring step and thereby carry out both steps continuously. However, the present inventors have now succeeded in reducing the prefiring time by preparing a spinnable mixture having a specific composition and specific properties and controlling the spinning, drying and prefiring conditions.

The most important feature of the method of the present invention is that, by seeking the optimum conditions for each of the spinnable mixture preparation, spinning, drying, prefiring and firing steps with due consideration for continuous operation and establishing the well-balanced residence time conditions for the respective steps, it has been made possible to carry out the spinning, drying, prefiring and firing steps continuously while allowing the continuous fiber in the form of a multifilament yarn to run as a single continuous fiber without being formed into bundles or wound on a bobbin. Another feature of the method of the present invention is that the performance and homogeneity of the resulting α-alumina fiber are markedly improved because each of the steps can be carried out with an appropriate tension applied to the fiber and because the deterioration of quality by non uniform heating and uneven tensioning that may occur in batchwise prefiring operation can be eliminated. Accordingly, the method of the present invention is very advantageous for industrial purposes.

DETAILED DESCRIPTION AND THE PREFERRED EMBODIMENTS

According to the present invention, there is provided a continuous process for producing long α-alumina fibers which uses, as the starting material, a slurry composed chiefly of an aqueous solution of a basic aluminum salt and an alumina powder, and which comprises the steps of preparing a spinnable mixture, spinning the spinnable mixture, and prefiring and firing the spun fiber, the process being characterized in that (a) the spinnable mixture preparation step comprises preparing a slurry by dispersing, in an aqueous solution of a basic aluminum salt, (i) an alumina powder having an average particle diameter of 0.1 μm or less and used in an amount of 10 to 40% by weight based on the total amount of oxides present in the finally obtained α-alumina fiber, (ii) a spinning aid used in an amount of 4 to 15% by weight based on the total amount of oxides, and optionally (iii) a sintering aid used in an amount, on an oxide basis, of not greater than 3% by weight based on the total amount of oxides, and diluting with water or concentrating the resulting dispersion so as to impart thereto a viscosity of 1,000 to 10,000 poises at 25° C.;

(b) the spinning step comprises dry-spinning the slurry through a spinneret having a plurality of orifices at a spinning rate of 5 to 50 meters per minute, and passing the spun filaments through a drying zone located in proximity to the spinneret, whereupon the filaments are heated to a maximum temperature of 150° C. at a temperature elevating rate of not greater than 1,500° C. per minute and united to form a multifilament yarn composed of precursor materials having free water not more than one-fifth of its original value;

(c) the prefiring step comprises prefiring the multifilament yarn by passing it, without being wound on bobbin, through a prefiring furnace including a first heating zone having a maximum temperature of 250° to 500° C. and a second heating zone kept at a temperature of 700° to 900° C., the ratio between the residence times of the multifilament yarn in the first and second heating zones ranging from 2:1 to 4:1, whereby the multifilament yarn having left said second heating zone gives a prefired fiber containing volatile components in an amount of 15 to 25% by weight based on the total weight of the prefired fiber;

(d) the firing step comprises heating the prefiled fiber at a temperature of 1,400° to 1,600° C. to evaporate the residual volatile components present therein rapidly;

(e) the steps (b) to (d) are carried out continuously; and (f) the finally obtained product has an alumina content of not less than 95% by weight.

The aqueous solution of basic aluminum salt used in the step of preparing a spinnable mixture should preferably have a concentration of not less than 30% by weight, and the salt should have such a purity as to yield, after firing, $Al_2O_3$ having a purity of not less than 95% by weight. Examples of the basic aluminum salt used for this purpose include basic aluminum chloride, basic aluminum nitrate, basic aluminum chloroacetate and the like. Among them, basic aluminum chloride is most preferred because of its high reactivity and ease of handling. Moreover, in order to enhance the fluidity of the spinnable mixture and increase the fiber strength by decreasing the volatile components produced in the prefiring and firing steps, an alumina powder (containing not less than 95% by weight of $Al_2O_3$ after firing) having an average particle diameter of 0.1 μm or less is added to the aqueous solution of basic aluminum salt and intimately blended therewith. The alumina powder is preferably used in such an amount as to provide 10 to 40% by weight, more preferably 20 to 35% by weight, of the total oxides present in the finally obtained alumina fiber. If the amount of alumina powder used is less than 10% by weight of the total oxides, the spinnable mixture will have such low fluidity that difficulties may be encountered in operation, and a marked shrinkage of the fiber will occur in the firing step. Moreover, as the spun precursor fiber will easily absorb moisture and, as a result, will tend to adhere to the fiber feed rolls and undergo fusion of the filaments. On the other hand, if the amount of alumina powder used is more than 40% by weight of the total oxides, the spinnable mixture will have such high fluidity that its spinnability will become poor, and the precursor fiber will tend to become dry and suffer from breakage. Moreover, the fired fiber will undesirably have poor homogeneity and denseness. In order to improve the spinnability of the spinnable mixture and obtain a fired fiber having as fine, uniform and dense crystal grains as possible, it is preferable to use an alumina powder having the smallest possible particle diameter. In practice, an alumina powder having an average particle diameter of 0.1 μm or less is preferably used.

The alumina powder added to the spinnable mixture may comprise α-alumina or γ-alumina. When α-alumina powder is used, the growth of crystal grains during the firing step is rapid and the fiber surfaces become irregular, so that the resulting fiber tends to show a reduction in tensile strength and have fragility. In contrast, when γ-alumina powder is used, the growth of crystal grains during the firing step is retarded, the crystal structure becomes dense, the fiber surfaces are smooth, and the resulting fiber has high tensile strength. Accordingly, it is more preferable to use γ-alumina powder as the additive powder.

Moreover, as a spinning aid for improving the spinnability of the spinnable mixture, one or more water-soluble organic polymers, (such as polyvinyl alcohol, polyethylene oxide, polypropylene oxide and the like) having an average molecular weight of 100,000 to 4,000,000 is added thereto in an amount of 4 to 15% by weight based on the total amount of oxides present in the finally obtained α-alumina fiber. If the amount of the spinning aid is less than 4% by weight, a satisfactory effect cannot be expected. On the other hand, if it is greater than 15% by weight, no additional effect will be produced. What is worse, the precursor fiber and the prefired fiber will have such a high content of combustible volatile components that the fiber will be liable to breakage, may show a deterioration of properties, and may be damaged by ignition in the firing step. The organic polymer or polymers added to the spinnable mixture are also effective in imparting flexibility to the resulting prefired fiber and thereby facilitating the succeeding firing step.

The step of preparing a spinnable mixture is carried out in the following manner: The abovedefined aqueous solution of basic aluminum salt, alumina powder and spinning aid are mixed together and well blended. The resulting mixture is diluted with water or concentrated under reduced pressure so as to achieve the optimum viscosity for spinning purposes. Although the optimum viscosity varies according to the types of the raw materials used, the composition of the spinnable mixture, and the spinning conditions, it is usually in the range of 1,000 to 10,000 poises at 25° C. and preferably in the range of 2,000 to 6,000 poises at 25° C.

In the composition of the spinnable mixture of the present invention, its viscosity is most greatly influenced by its water content. If the viscosity of the spinnable mixture is lower than 1,000 poises, the spinnable mixture will have poor spinnability and flow easily, resulting in a non-uniform fiber shape. Moreover, the fiber cannot be fully dried in the drying step and the precursor fiber will be liable to fusion. On the other hand, if the viscosity of the spinnable mixture is higher than 10,000 poises, difficulties will be encountered in drying the spun filaments and, in particular, the filaments may often be broken in the drying column.

The present inventors have also found that the mechanical strength of the resulting long α-alumina fiber can be markedly improved by adding to the spinnable mixture a sintering aid comprising one or more members selected from the group consisting of oxides of certain elements and precursor compounds convertible into such oxides in the prefiring and firing steps. More specifically, as a result of investigation on 30 or more oxides and combinations thereof, it has been found that $CuO$, $MgO$, $PbO$, $Cr_2O_3$, $Fe_2O_3$, $MoO_3$, $TiO_2$ and combinations of these oxides are effective in improving the mechanical strength of the resulting long α-alumina fiber. In particular, two-component additives comprising two members selected from $CuO$, $MgO$, $Cr_2O_3$ and $Fe_2O_3$ have been found to be markedly effective. Among them, combinations of $CuO-MgO$, $CuO-Cr_2O_3$ and $MgO-Fe_2O_3$ are especially preferred. These additives are preferably used in the form of precursors having a good affinity for water. However, if they are added to the spinnable mixture in the form of organic acid salts (such as citrates, stearates and the like) or hydroxides, the spinnable mixture may have poor spinnability and the resulting fiber may have low mechanical strength. Accordingly, it is preferable to use them in the form of inorganic acid salts such as chlorides, nitrates and sulfates. Where these additives are used in the form of oxides, they must be finely powdered to a particle diameter of 0.1 μm or less in order to permit them to be dispersed as uniformly as possible. The sintering aid is preferably used in an amount, on an oxide basis, of not greater than 3% by weight based on the total amount of oxides present in the finally obtained α-alumina fiber. Since these oxides have a lower melting point than $Al_2O_3$, the addition of greater amounts of them will undesirably reduce the high-temperature resistance of the resulting fiber.

The process of the present invention is characterized in that a long α-alumina fiber is obtained by using the spinnable mixture prepared in the above-described manner and continuously carrying out various steps including spinning into a precursor fiber and its drying, prefiring and firing. More specifically, a slurry composed chiefly of an alumina powder and a basic aluminum salt is spun into a precursor fiber, which is heat-treated to evaporate the free water, the water of crystallization and other volatile components derive from the basic aluminum salt, the volatile components derived from the organic polymer used as the spinning aid, and the like. Thus, there is finally obtained a long α-alumina fiber composed entirely of oxides. However, the aforesaid precursor fiber is liable to fusion and has fragility, and undergoes a marked shrinkage as a result of the evaporation of volatile components. Accordingly, in order to carry out the spinning, drying, prefiring and firing steps continuously, it is necessary to establish the strict operating conditions including heating rates, heating temperatures and the like.

In the spinning and drying step, the spinnable mixture is dry-spun by extruding it through a spinneret having a plurality of orifices of 0.2 to 1.0 mm diameter. Then, the spun filaments are dried in a heating atmosphere having a maximum temperature of 150° C. or below at a temperature elevating rate of not greater than 1,500° C. per minute, preferably 100° to 800° C. per minute, and united to form a precursor fiber comprising a multifilament yarn having a diameter of 7 to 30 μm. The spinning rate (which is equal to the feed rate of the precursor fiber or multifilament yarn) may be determined with consideration for the properties of the spinnable mixture and the drying, prefiring and firing conditions. However, the spinning rate is preferably in the range of 5 to 50 meters per minute.

When the spun filaments are dried and united to form a precursor fiber, it is desirable to evaporate 80% or more, preferably almost all, of the free water contained in the spinnable mixture. At this stage, however, rapid heating or drying at high temperature should be avoided because it brings about a rapid shrinkage of the precursor fiber and forms a cause of fiber breakage. In one preferred embodiment, a drying column provided with a heating zone having a temperature of 130° to 150° C. in the lower part is disposed below the spinneret. The filaments spun at room temperature or thereabout are passed through the drying column in a downward direction. The water evaporated in the drying column, together with the stream of air spontaneously flowing upward therethrough, is discharged through the gap formed between the spinneret and the drying column. Depending on the spinning rate and the heating conditions, the length of the drying column may be suitably determined so that 80% or more of the water contained in the spinnable mixture will be removed. However, as described above, due consideration should be given to the fact that the temperature elevating rate must be not greater than 1,500° C. per minute. By carrying out the spinning and drying step under these conditions, a homogeneous precursor fiber comprising a multifilament yarn can be obtained without suffering from fiber breakage due to rapid shrinkage or fusion due to insufficient drying.

In the precursor fiber from which almost all free water has been removed in the spinning and drying step, volatile components are still present in an amount ranging from 40% to 55% by weight of its total weight. Then, this precursor fiber is gradually heated to remove the volatile components completely and thereby obtain an α-alumina fiber composed essentially of oxides, during which time a linear shrinkage of about 35% occurs. Accordingly, in order to prevent the fiber from being broken by rapid shrinkage, it has been thought that this step should involve very gradual heating. In the prior art, therefore, a long time has been required for prefiring and firing purposes.

The present inventors have closely investigated the progress of evaporation of various volatile components during this heat treatment step and have found that the overall residence time required for the heat treatment step can be reduced by properly determining the residence time at each temperature. This finding has made it possible to carry out the spinning and heat treatment steps continuously. In order to convert the aforesaid precursor fiber into an α-alumina fiber, the former must ultimately be heat-treated at a high temperature of 1,400° to 1,600° C. In the process of the present invention, this heat treatment step is divided into two substeps: the firing step comprising heat treatment at a temperature of 1,400° to 1,600° C. and the prefiring step comprising preliminary heat treatment at relatively lower temperatures.

According to the results of the investigation by the present inventors, when the precursor fiber is heated to expel the volatile components contained therein, the water of crystallization of the basic aluminum salt evaporates at first. This is followed by evaporation of the decomposition products of the basic aluminum salt and, partly in parallel, evaporation of the volatile components derived from the organic polymer. In order to carry out the final firing step smoothly, it is desirable that the prefired fiber passes into the firing step while substantially the whole amount (i.e., 4 to 15 parts by weight per 100 parts by weight of the total oxides) of the volatile components derived from the organic polymer used as the spinning aid remains in the prefired fiber. To this end, it is preferable that the prefired fiber leaving the prefiring step has a volatiles content of 15 to 25% by weight. From this standpoint, it is necessary to reduce the volatiles content of the precursor fiber, which initially contains 40 to 45% by weight of volatile components, to 15 to 25% by weight in the prefiring step. During the course of gradual heating of the precursor, vigorous evaporation of volatile components, probably consisting chiefly of the water of crystallization of the basic aluminum salt, occurs in the temperature region of 200° to 300° C. Accordingly, it is preferable to carry out the prefiring step in two stages as follows. Specifically, the multifilament yarn having left the spinning and drying step is prefired by passing it through a prefiring furnace divided into a first heating zone having a gentle temperature gradient extending from room temperature to a maximum temperature of 250° to 500° C. and a second heating zone kept at a temperature of 700° to 900° C. In the first heating zone, more than half of the volatile components to be removed in the prefiring step are evaporated. At this stage, the water of crystallization of the basic aluminum salt evaporates completely and, partly in parallel, the basic aluminum salt begins to decompose. Thereafter, it is possible to heat the fiber at a relatively high rate. Thus, the fiber is advanced to the second heating zone, where it is prefired until its total volatiles content is reduced to a level of 15 to 25% by weight. If the residual volatiles content of the prefired fiber is greater than 25% by weight, a marked shrinkage of the fiber will occur in the succeeding firing step. On the other hand, if it is less than 15% by weight, the amount of the organic materials derived from the spinning aid and present in a substantially carbonized form will be reduced. As a result, the prefired fiber will become fragile and will be liable to breakage during passage to the succeeding firing step. Moreover, it is undesirable from the viewpoint of fiber properties to heat-treat the fiber at this stage until its volatiles content becomes too low, because this causes α-alumina crystals to grow excessively. In the first heating zone, the fiber should be heated gently because abrupt evaporation of the volatile components tends to occur especially at the initial stage of the heating. Accordingly, the method of the present invention specifies that the residence time in the first heating zone should be 2 to 4 times as long as the residence time in the second heating zone. In other words, it is preferable that the ratio between the residence times in the first and second heating zones ranges from about 2:1 to about 4:1, though it depends on the types and qualities of the raw materials used, the composition of the spinnable mixture, heating conditions, and the like. In one preferred embodiment, the first heating zone is so designed that the tangent of the temperature gradient established therein remains constant from entrance to exit or increases steadily. Where the treating time in the high-temperature region is relatively long, the precursor fiber should preferably be prefired in a stream of an inert gas (such as nitrogen or the like) in order to prevent combustion of the organic materials.

In the method of the present invention, the prefiring step may be carried out either by use of a single furnace or by use of two furnaces. Moreover, if the temperature is properly controlled, it is also possible to carry out the prefiring and firing steps in the same furnace.

In order to obtain an α-alumina fiber having high tensile strength and high elastic modulus, it is desirable to refire the yarn under an appropriate tension by properly adjusting the yarn feeding mechanism. By way of example, a dancing roller or the like can be used to apply a load of 0.01 to 0.3 g per filament to the yarn.

After leaving the prefiring step, the prefired fiber is subjected to a firing step for expelling the remaining volatile components to yield an α-alumina fiber composed of fine α-alumina crystal grains. This firing step is carried out by passing the fiber through a heating zone having a temperature of 1,400° to 1,600° C. while applying an appropriate tension to the fiber. In this step, it is desirable to use a high heating rate, preferably of not less than 100° C. per second. If the heating rate at this stage is low, the α-alumina crystal grains will grow significantly, resulting in a reduced fiber strength.

The present invention is further illustrated by the following examples. In these examples, the fiber diameter, tensile strength and elastic modulus in tension of the resulting α-alumina fiber were determined as the average values for randomly sampled 50 filaments. The tensile tests were made at a gauge length of 25 mm.

EXAMPLE 1

(Preparation of Spinnable Mixture)

300 g of γ-alumina powder (oontaining not less than 97% by weight of $Al_2O_3$) having an average particle diameter of 0.02 μm was mixed with 3,000 g of an aqueous solution of basic aluminum chloride (containing 23.5% by weight of the salt as expressed in terms of $Al_2O_3$). Then, 1,800 g of a 5% (w/w) aqueous solution of polyethylene oxide having an average molecular weight of 600,000 to 1,100,000 was added thereto with stirring and intimately blended therewith. The resulting mixture was concentrated under reduced pressure to obtain a spinnable mixture having a viscosity of 6,500 poises at 25° C.

(Spinning)

The spinnable mixture obtained in the above-described manner was placed in a starting material tank and spun through a spinneret having 300 orifices of 0.5 mm diameter. The spun filaments were dried by passing them through a vertically positioned drying column having a length of about 3 meters. Thus, a multifilament yarn composed of 300 filaments was obtained as precursor fiber. The temperature of the drying column was adjusted to 130° C. in the lower part and 40° C. in the upper part. The spinning rate was varied between 5 and 60 meters per minute.

(Prefiring and Firing)

The above multifilament yarn obtained as precursor fiber was prefired by conducting it through a tension device to a vertical prefiring furnace having a length of 4 meters and passing it therethrough in a downward direction. The prefiring furnace is provided with an apertured partition at a position 3 meters away from the entrance, and divided thereby into the upper and lower parts. The temperature of the prefiring furnace was adjusted to room temperature at the entrance, 300° C. in the vicinity of the apertured partition, and 800° C. in the lower part below the partition. In the prefiring furnace, an inert atmosphere was maintained by flowing nitrogen gas therethrough at a rate of 2 liters per minute. The prefired fiber having left the prefiring furnace was then fired by passing it through a firing furnace having a length of 2 meters and an internal temperature of 1,500° C. The resulting continuous alumina fiber was taken up on a drum. Because of the shrinkage of the fiber during the heat treatment, the take-up rate was about 0.65 time the spinning rate. The continuous alumina fibers thus obtained had an $Al_2O_3$ content of 99.7% by weight, and X-ray diffraction analysis revealed that they consisted entirely of $\alpha$-alumina. The results of other analyses and measurements are shown in Table 1. It is evident from Table 1 that fibers having high tensile strength and high eslatic modulus are obtained at spinning rates in the range of 5 to 50 meters per minute.

TABLE 1

| Spinning rate (m/min.) | Residual volatiles content (wt. %) | | $\alpha$-Alumina fiber | | |
|---|---|---|---|---|---|
| | Precursor fiber | Prefired fiber | Fiber diameter ($\mu$m) | Tensile strength (kg/mm$^2$) | Elastic modulus in tension (t/mm$^2$) |
| 5 | 45 | 17 | 11.3 | 201 | 36 |
| 10 | 47 | 20 | 11.7 | 197 | 35 |
| 20 | 49 | 22 | 10.8 | 195 | 35 |
| 50 | 52 | 25 | 10.0 | 168 | 30 |
| 60 | 57 | 33 | 11.8 | 148 | 28 |

EXAMPLE 2

(Preparation of Spinnable Mixture)

A spinnable mixture was prepared in the same manner as described in Example 1, except that the resulting mixture was concentrated so as to have a viscosity of 4,000 poises at 25° C.

(Spinning)

This spinnable mixture was spun in the same manner as described in Example 1, except that the spinning rate was fixed at 20 meters per minute. Thus, a multifilament yarn composed of 300 filaments was obtained as precursor fiber. This precursor fiber had a volatiles content of 50% by weight.

(Prefiring and Firing)

The above multifilament yarn obtained as precursor fiber was prefired by conducting it through a tension device to prefiring furnace 1 having a length of 3 meters (hereinafter referred to as "first-stage prefiring zone") and then to prefiring furnace 2 having a length of 1.5 meters (hereinafter referred to as "second stage prefiring zone"). In this case, the temperature of prefiring furnace 1 was adjusted to room temperature at the entrance and 200°–500° C. in the lower part, while the temperature of prefiring furnace 2 was adjusted to 700°–1,000° C. in the lower part. The resulting prefired fiber was then fired by passing it, under tension, through a firing furnace having a length of 2 meters and an internal temperature of 1,500° C. The resulting continuous alumina fiber was taken up on a drum. The take-up rate was about 13 meters per minute. The properties of the fibers thus obtained are shown in Table 2. It can be seen from this table that fibers having good properties are obtained when the maximum temperature of the first-stage prefiring zone is adjusted to 300°–500° C. and the temperature of the second-stage prefiring zone is adjusted to 900° C. or below.

TABLE 2

| | Prefiring conditions | | Volatiles content of prefired fiber (wt. %) | $\alpha$-Alumina fiber | | | |
|---|---|---|---|---|---|---|---|
| No. | Maximum temperature of first-stage prefiring zone (°C.) | Temperature of second stage prefiring zone (°C.) | | Fiber diameter ($\mu$m) | Tensile strength (kg/mm$^2$) | Elastic modulus in tension (t/mm$^2$) | $Al_2O_3$ content (wt. %) |
| 1 | 200 | 700 | 32 | 10.5 | 85 | 16 | 99.7 |
| 2 | | 800 | 28 | 10.2 | 60 | 15 | 99.8 |
| 3 | 300 | 700 | 25 | 10.2 | 180 | 31 | 99.7 |
| 4 | | 800 | 22 | 10.8 | 195 | 35 | 99.7 |
| 5 | | 900 | 20 | 11.0 | 190 | 33 | 99.8 |
| 6 | | 1000 | 13 | 10.8 | 120 | 22 | 99.8 |
| 7 | 400 | 700 | 23 | 11.5 | 165 | 28 | 99.8 |
| 8 | | 800 | 20 | 11.4 | 179 | 31 | 99.8 |
| 9 | | 900 | 16 | 10.8 | 180 | 30 | 99.8 |
| 10 | | 1000 | 10 | 11.0 | 135 | 25 | 99.9 |
| 11 | 500 | 700 | 20 | 12.0 | 162 | 27 | 99.8 |
| 12 | | 800 | 17 | 11.5 | 168 | 28 | 99.8 |
| 13 | | 900 | 15 | 11.2 | 152 | 28 | 99.8 |
| 14 | | 1000 | 8 | 11.2 | 121 | 23 | 99.9 |

EXAMPLE 3

300 g of $\gamma$-alumina powder (containing not less than 97% by weight of $Al_2O_3$) having an average particle diameter of 0.02 $\mu$m and each of the additives shown in Table 3 (which were used in the form shown therein and in the varying amounts shown therein) were added to and mixed with 3,000 g of an aqueous solution of basic aluminum chloride (containing 23.5% by weight of the salt as expressed in terms of $Al_2O_3$). Then, 1,800 g of a 5% (w/w) aqueous solution of polyethylene oxide having an average molecular weight of 600,000 to 1,100,000 was added thereto with stirring and well blended therewith. The resulting mixture was concentrated under reduced pressure to obtain a spinnable mixture having a viscosity of 2,500 poises at 25° C. This spinnable mixture was spun at a rate of 20 meters per minute, so that a multifilament yarn composed of 300 filaments was obtained as precursor fiber. Thereafter, this multifilament yarn was prefired and fired under the same conditions as described in Example 1 to obtain a continuous α-alumina fiber.

The properties of the α-alumina fibers thus obtained are shown in Table 3. It can be seen from this table that the tensile strength and elastic modulus in tension of the fibers can be improved by the addition of an appropriate amount of each of the additives shown in Table 3.

TABLE 3

| | Additive | | | α-Alumina fiber | | | |
|---|---|---|---|---|---|---|---|
| No. | Type | Form of added salt | Amount added (%)* (oxide basis) | Fiber diameter (μm) | Tensile strength (kg/mm²) | Elastic modulus in tension (t/mm²) | $Al_2O_3$ content (wt %) |
| 1 | None | — | — | 10.8 | 195 | 35 | 99.7 |
| 2 | CuO | Chloride | 0.1 | 10.6 | 196 | 34 | 99.6 |
| | | | 1 | 11.0 | 207 | 36 | 98.6 |
| | | | 5 | 11.0 | 190 | 32 | 94.8 |
| 3 | MgO | Chloride | 0.1 | 10.2 | 194 | 34 | 99.6 |
| | | | 1 | 10.3 | 210 | 36 | 98.6 |
| | | | 5 | 10.2 | 203 | 33 | 94.7 |
| 4 | PbO | Acetate | 0.1 | 10.8 | 194 | 30 | 99.7 |
| | | | 1 | 10.6 | 200 | 35 | 98.7 |
| | | | 5 | 10.8 | 135 | 27 | 94.7 |
| 5 | $Cr_2O_3$ | Chloride | 0.1 | 11.1 | 196 | 34 | 99.6 |
| | | | 1 | 11.2 | 205 | 34 | 98.6 |
| | | | 5 | 10.8 | 204 | 35 | 94.8 |
| 6 | $Fe_2O_3$ | Chloride | 0.1 | 10.6 | 195 | 33 | 99.5 |
| | | | 1 | 10.6 | 208 | 34 | 98.6 |
| | | | 5 | 10.5 | 208 | 33 | 94.7 |
| 7 | $MoO_3$ | Ammonium salt | 0.1 | 11.3 | 193 | 32 | 99.5 |
| | | | 1 | 11.1 | 198 | 32 | 98.5 |
| | | | 5 | 11.7 | 120 | 26 | 94.6 |
| 8 | $TiO_2$ | Chloride | 0.1 | 11.1 | 192 | 33 | 99.7 |
| | | | 1 | 11.1 | 199 | 34 | 98.6 |
| | | | 5 | 11.5 | 133 | 25 | 94.7 |

*Expressed as percentages based on the total amount of oxides present in the finally obtained α-alumina fiber.

EXAMPLE 4

Long α-alumina fibers were prepared in the same manner as described in Example 3, except that each of the two-component additives shown in Table 4 was added in the form of chlorides and in an amount, on an oxide basis, of 1% by weight based on the total amount of oxides present in the finally obtained α-alumina fiber. The properties of the fibers thus obtained are shown in Table 4. It can be seen from this table that these two-component additives are highly effective in improving the properties of the resulting fiber.

TABLE 4

| | Additive | | α-Alumina fiber | | | |
|---|---|---|---|---|---|---|
| No. | Type | weight ratio | Fiber diameter (μm) | Tensile strength (kg/mm²) | Elastic modulus in tension (t/mm²) | $Al_2O_3$ content (wt %) |
| 1 | None | — | 10.8 | 195 | 35 | 99.7 |
| 2 | CuO—MgO | 3:1 | 10.7 | 233 | 40 | 98.6 |
| 3 | | 2:1 | 10.2 | 235 | 41 | 98.8 |
| 4 | | 1:1 | 10.6 | 230 | 40 | 98.6 |
| 5 | | 1:2 | 10.5 | 212 | 36 | 98.7 |
| 6 | | 1:3 | 10.5 | 205 | 33 | 98.7 |
| 7 | CuO—$Cr_2O_3$ | 3:1 | 11.0 | 220 | 35 | 98.6 |
| 8 | | 2:1 | 10.3 | 223 | 37 | 98.5 |
| 9 | | 1:1 | 10.3 | 220 | 35 | 98.5 |
| 10 | | 1:2 | 10.8 | 212 | 35 | 98.6 |
| 11 | | 1:3 | 10.5 | 204 | 35 | 98.5 |
| 12 | MgO—$Fe_2O_3$ | 3:1 | 10.8 | 215 | 36 | 98.5 |
| 13 | | 2:1 | 11.0 | 219 | 36 | 98.4 |
| 14 | | 1:1 | 11.2 | 221 | 36 | 98.5 |
| 15 | | 1:2 | 11.3 | 208 | 32 | 98.3 |
| 16 | | 1:3 | 10.9 | 208 | 31 | 98.3 |
| 17 | CuO—$Fe_2O_3$ | 3:1 | 10.9 | 215 | 35 | 98.2 |
| 18 | | 2:1 | 10.8 | 217 | 35 | 98.3 |
| 19 | | 1:1 | 11.2 | 216 | 34 | 98.3 |
| 20 | | 1:2 | 10.8 | 215 | 34 | 98.2 |
| 21 | | 1:3 | 10.7 | 208 | 34 | 98.2 |
| 22 | MgO—$Cr_2O_3$ | 3:1 | 10.5 | 205 | 35 | 98.3 |
| 23 | | 2:1 | 10.6 | 212 | 36 | 98.3 |
| 24 | | 1:1 | 10.6 | 212 | 34 | 98.4 |
| 25 | | 1:2 | 10.8 | 209 | 34 | 98.2 |

TABLE 4-continued

| | Additive | | α-Alumina fiber | | | |
|---|---|---|---|---|---|---|
| No. | Type | weight ratio | Fiber diameter (μm) | Tensile strength (kg/mm$^2$) | Elastic modulus in tension (t/mm$^2$) | Al$_2$O$_3$ content (wt %) |
| 26 | | 1:3 | 10.5 | 209 | 33 | 98.2 |

(1) Notes:.
(1) The additive was added in an amount, on an oxide basis, of 1% by weight based on the total amount of oxides present in the finally obtained α-alumina fiber.
(2) The additive was added in the form of chlorides and dissolved in the spinnable mixture.

EXAMPLE 5

Experiments were carried out in the same manner as described in Example 4, except that each of the two-component additives shown in Table 5 was added in varying amounts. The high-temperature resistance of each fiber was evaluated by allowing the fiber to stand at 1,600° C. for 1 hour and then measuring its degree of shrinkage and retention of tensile strength at room temperature. The results thus obtained are shown in Table 5. It can be seen from this table that continuous long α-alumina fibers having excellent high-temperature resistance can be obtained when each of the aforesaid additives is added in an amount, on an oxide basis, of not greater than 3% by weight.

polyethylene oxide and the spinning rate was fixed at 20 meters per minute. Thus, there was obtained a good α-alumina fiber having an Al$_2$O$_3$ content of 99.2% by weight, a tensile strength of 186 kg/mm$^2$, and an elastic modulus in tension of 32 t/mm$^2$.

EXAMPLE 7

The procedure of Example 6 was repeated except that 300 g of γ-alumina powder (containing 99.99% by weight of Al$_2$O$_3$) having an average particle diameter of 0.015 μm was used in place of the γ-alumina powder (containing not less than 97% by weight of Al$_2$O$_3$) having an average particle diameter of 0.02 μm. Thus, there was obtained a good α-alumina fiber having an Al$_2$O$_3$ content of 99.8% by weight, a tensile strength of

TABLE 5

| Additive | | α-Alumina fiber | | | Properties after standing at 1600° C. for 1 hour | | |
|---|---|---|---|---|---|---|---|
| Type (weight ratio) | Amount added (wt. %) (oxide basis) | Fiber diameter (μm) | Tensile strength (kg/mm$^2$) | Elastic modulus in tension (t/mm$^2$) | Degree of shrinkage (%) | Retention of tensile strength (%) | Al$_2$O$_3$ content (wt %) |
| CuO—MgO (1:1) | 0.5 | 10.3 | 223 | 36 | 0.3 | 94 | 99.2 |
| | 1 | 10.6 | 230 | 40 | 0.5 | 94 | 98.6 |
| | 2 | 10.6 | 218 | 33 | 0.8 | 92 | 97.4 |
| | 3 | 10.7 | 215 | 32 | 0.9 | 91 | 96.7 |
| | 4 | 10.6 | 189 | 31 | 2.1 | 80 | 95.5 |
| | 5 | 10.5 | 153 | 28 | 3.2 | 62 | 94.6 |
| CuO—Cr$_2$O$_3$ (1:1) | 0.5 | 10.2 | 215 | 35 | 0.4 | 94 | 99.1 |
| | 1 | 10.3 | 220 | 35 | 0.6 | 92 | 98.5 |
| | 2 | 10.5 | 225 | 37 | 0.8 | 91 | 97.4 |
| | 3 | 10.7 | 227 | 35 | 1.0 | 90 | 96.5 |
| | 4 | 10.3 | 201 | 33 | 2.3 | 62 | 95.5 |
| | 5 | 10.8 | 167 | 32 | 3.5 | 38 | 94.6 |
| MgO—Fe$_2$O$_3$ (1:1) | 0.5 | 11.0 | 215 | 35 | 0.4 | 95 | 99.0 |
| | 1 | 11.2 | 218 | 36 | 0.5 | 93 | 98.5 |
| | 2 | 11.0 | 221 | 35 | 0.7 | 93 | 97.6 |
| MgO—Fe$_2$O$_3$ (1:1) | 3 | 10.8 | 201 | 30 | 0.8 | 92 | 96.6 |
| | 4 | 10.9 | 165 | 28 | 1.5 | 81 | 95.5 |
| | 5 | 11.2 | 160 | 28 | 2.8 | 65 | 94.5 |
| CuO—Fe$_2$O$_3$ (1:1) | 0.5 | 11.0 | 215 | 34 | 0.5 | 93 | 99.3 |
| | 1 | 11.2 | 216 | 34 | 0.7 | 91 | 98.3 |
| | 2 | 10.9 | 208 | 33 | 0.8 | 91 | 97.2 |
| | 3 | 10.8 | 201 | 33 | 1.0 | 90 | 96.3 |
| | 4 | 10.9 | 203 | 33 | 2.2 | 71 | 95.3 |
| | 5 | 11.0 | 132 | 26 | 4.0 | 42 | 94.2 |
| MgO—Cr$_2$O$_3$ (1:1) | 0.5 | 10.7 | 210 | 35 | 0.2 | 95 | 99.1 |
| | 1 | 10.6 | 212 | 34 | 0.5 | 95 | 98.4 |
| | 2 | 10.6 | 205 | 33 | 0.7 | 92 | 97.5 |
| | 3 | 10.7 | 204 | 32 | 0.8 | 93 | 96.4 |
| | 4 | 10.0 | 190 | 32 | 1.3 | 78 | 95.4 |
| | 5 | 10.9 | 162 | 29 | 1.8 | 51 | 94.5 |

(1) Notes:
(1) The additive was added in the form of chlorides and dissolved in the spinnable mixture. The amount added is based on the total amount of oxides present in the finally obtained α-alumina fiber.
(2) The retention of tensile strength is expressed as the percentage of the tensile strength after heat resistance test to that before the test.

EXAMPLE 6

The procedure of Example 1 was repeated except that 2,500 g of a 4% (w/w) aqueous solution of polyvinyl alcohol having a degree of polymerization of 1,700 to 2,400 was used in place of the aqueous solution of 193 kg/mm$^2$, and an elastic modulus in tension of 33 t/mm$^2$.

EXAMPLE 8

Spinnable mixtures having the respective viscosities shown in Table 6 were prepared in the same manner as described in Example 1, except that the aqueous solution of basic aluminum chloride (containing 23.5% by weight of the salt as expressed in terms of $Al_2O_3$) and the γ-alumina powder having an average particle diameter of 0.02 μm were used in varying proportions. Then, employing the same conditions as described in Example 1 except that the temperature of the drying column was adjusted as shown in Table 6, each of the aforesaid spinnable mixtures was spun at a spinning rate of 20 meters per minute and dried. Thereafter, the resulting precursor fiber was prefired and fired in the same manner as described in Example 1. The properties of the continuous α-alumina fibers thus obtained are shown in Table 6, indicating that these α-alumina fibers were of good quality.

TABLE 6

| Amount of aqueous solution of basic aluminum chloride used (g) | Amount of α-alumina powder used (g) | wt. % based on total amount of oxides | Viscosity of spinnable mixture (at 25° C.) (poises) | Drying column temperature (°C.) Upper part | Drying column temperature (°C.) Lower part | α-Alumina fiber Fiber diameter (μm) | α-Alumina fiber Tensile strength (kg/mm²) | α-Alumina fiber Elastic modulus in tension (t/mm²) |
|---|---|---|---|---|---|---|---|---|
| 3,830 | 100 | 10 | 6,700 | 35–40 | 145 | 11.0 | 168.0 | 30 |
| 3,400 | 200 | 20 | 6,500 | " | 135–140 | 10.5 | 189.2 | 34 |
| 2,760 | 350 | 35 | 5,800 | " | 120–125 | 10.6 | 185.3 | 33 |
| 2,500 | 400 | 40 | 5,000 | " | 110 | 10.2 | 145.2 | 25 |

EXAMPLE 9

Spinnable mixtures having a viscosity of 6,500 poises at 25° C. were prepared in the same manner as described in Example 1, except that the specified amount of each of polyethylene oxides having different average molecular weights was used in place of the 5% (w/w) aqueous solution (1,800 g) of polyethylene oxide having an average molecular weight of 600,000 to 1,100,000. Employing the same conditions as described in Example 1, each of the aforesaid spinnable mixtures was spun at a spinning rate of 20 meters per minute and the resulting precursor fiber was prefired and fired to obtain a continuous α-alumina fiber. The properties of the α-alumina fibers thus obtained are shown in Table 6. It can be seen from this table that, even when an organic polymer having a different molecular weight is used as the spinning aid, continuous α-alumina fibers of good quality can be obtained by properly determining the amount of organic polymer used.

TABLE 7

| Polyethylene oxide Average molecular weight (× 10⁴) | Amount of aqueous solution used Concentration (wt. %) | Amount of aqueous solution used (g) | wt. % based on total amount of oxides | α-Alumina fiber Fiber diameter (μm) | α-Alumina fiber Tensile strength (kg/mm²) | α-Alumina fiber Elastic modulus in tension (t/mm²) |
|---|---|---|---|---|---|---|
| 15–40 | 10 | 1,500 | 15 | 10.2 | 190.2 | 34 |
| 170–220 | 4 | 1,750 | 7 | 10.8 | 192.3 | 35 |
| 330–380 | 2.5 | 2,000 | 5 | 11.0 | 189.5 | 34 |

We claim:

1. A continuous process for producing long α-alumina fibers which uses, as the starting material, a slurry composed chiefly of an aqueous solution of a basic aluminum salt and an alumina powder, and, which comprises the steps of preparing a spinnable mixture, spinning the spinnable mixture, and prefiring and firing the spun fiber, said process being characterized in that (a) said spinnable mixture preparation step comprises preparing a slurry by dispersing, in an aqueous solution of a basic aluminum salt, (i) an alumina powder having an average particle diameter of 0.1 μm or less and used in an amount of 10 to 40% by weight based on the total amount of oxides present in the finally obtained α-alumina fiber, (ii) a spinning aid used in an amount of 4 to 15% by weight based on said total amount of oxides, and optionally (iii) a sintering aid used in an amount, on an oxide basis, of not greater than 3% based on said total amount of oxides, and diluting with water or concentrating the resulting dispersion so as to impart thereto a viscosity of 1,000 to 10,000 poises at 25° C.;

(b) said spinning step comprises dry-spinning said slurry through a spinneret having a plurality of orifices at a spinning rate of 5 to 50 meters per minute, and passing the spun filaments through a drying zone located in proximity to said spinneret, whereupon said filaments are heated to a maximum temperature of 150° C. at a temperature elevating rate of not greater than 1,500° C. per minute and united to form a multifilament yarn composed of precursor materials having free water not more than one-fifth of its original value;

(c) said prefiring step comprises prefiring said multifilament yarn by passing it, without being wound on a bobbin, through a prefiring furnace including a first heating zone having a maximum temperature of 250° to 500° C. and a second heating zone kept at a temperature of 700° to 900° C., the ratio between the residence times of said multifilament yarn in said first and second heating zones ranging from 2:1 to 4:1, whereby the multifilament yarn having left said second heating zone gives a prefired fiber containing volatile components in an amount of 15 to 25% by weight based on the total weight of said prefired fiber;

(d) said firing step comprises heating said prefired fiber at a temperature of 1,400° to 1,600° C. to evaporate the residual volatile components present therein rapidly;

(e) said steps (b) to (d) are carried out continuously; and (f) the finally obtained product has an alumina content of not less than 95% by weight.

2. A process as claimed in claim 1 wherein the drying zone used in said spinning step comprises a drying column disposed in a substantially vertical position just below said spinneret with a gap formed therebetween so as to allow the stream of air flowing upward in said drying column to be discharged therethrough, said drying column being constructed in such a way that its internal temperature becomes higher as it goes from top to bottom and that the spun filaments are passed therethrough in a downward direction.

3. A process as claimed in claim 1 wherein, said spinning step is carried out at a temperature elevating rate of 100° C. to 800° C. per minute.

4. A process as claimed in claim 1 wherein said prefiring step is carried out while said multifilament yarn is placed under tension by the application of a load of 0.01 to 0.3 g per filament.

5. A process as claimed in claim 1 or 2 wherein the alumina powder used in said spinning mixture preparation step is $\gamma$-alumina powder.

6. A process as claimed in any one of claims 1 to 3 wherein the basic aluminum salt used in said spinning mixture preparation step is basic aluminum chloride.

7. A process as claimed in any one of claims 1 to 4 wherein the sintering aid optionally used in said spinning mixture preparation step comprises one or more members selected from the group consisting of CuO, MgO, PbO, $Cr_2O_3$, $Fe_2O_3$, $MoO_3$, $TiO_2$, and precursors that can be converted into any of the foregoing oxides in said prefiring and firing steps.

8. A process as claimed in claim 7 wherein said sintering aid comprises two or more members selected from the group consisting of CuO, MgO, PbO, $Cr_2O_3$ and $Fe_2O_3$.

9. A process as claimed in claim 8 wherein said sintering aid comprises a combination of CuO and MgO, a combination of CuO and $Cr_2O_3$, or a combination of MgO and $Fe_2O_3$.

* * * * *